United States Patent Office 3,507,555
Patented Apr. 21, 1970

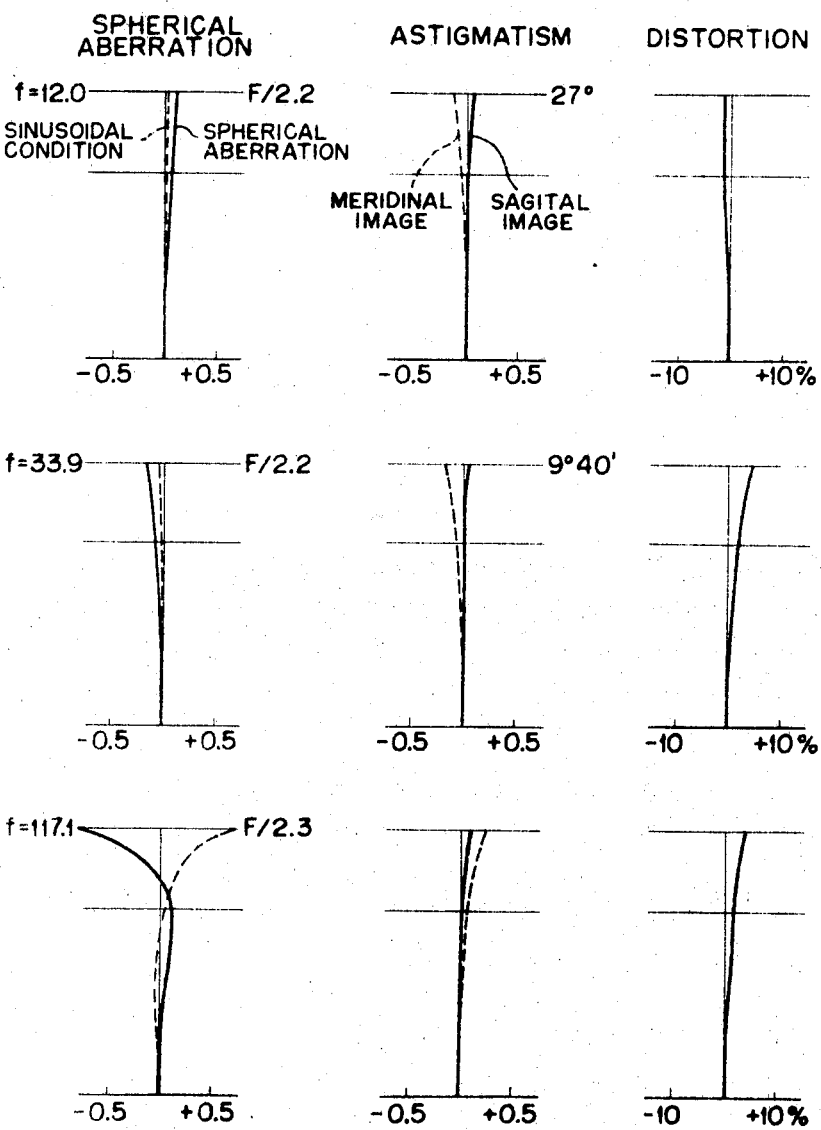

3,507,555
ZOOM LENS OPTICAL SYSTEM
Masaki Isshiki, Tokyo, Japan, assignor to Nippon Kogaku K.K., Tokyo, Japan, a corporation of Japan
Filed Apr. 3, 1967, Ser. No. 627,726
Int. Cl. G02b 15/16
U.S. Cl. 350—184
2 Claims

ABSTRACT OF THE DISCLOSURE

Zoom lens optical system of the mechanical compensation type is disclosed consisting of four lens blocks, the second and third blocks being movable in opposite directions along the optical axis. The second lens block is negative while the third lens block is positive and comprises two front single lenses and a cemented doublet, the curvature of the front surface being larger than the curvature of the rear surface of the front lenses for maintaining the flatness of image throughout the zooming range.

This invention relates to a zoom lens optical system having a high zooming ratio.

It is very difficult to maintain the high efficiency of a zoom lens having a high zooming ratio unless the size of the zoom lens is made large. The present invention provides a zoom lens optical system having a zooming ratio of about 10 times. The zoom lens of the present invention is mainly used as a lens in photography, and in accordance with the present invention, in spite of a high zooming ratio, the structure thereof is simple and at the same time the size thereof is small and covers a wide angle. The angle of view at the minimum focal length is 54° in one embodiment, and is 60° in a second embodiment; spherical aberration, astigmatism, coma distortion, and chromatic aberration being sufficiently corrected. The contrast of the image is excellent, and as is hereinafter described, the flatness of the image is very excellent.

The zoom lens system of the present invention belongs to a zoom lens of the mechanical compensation type which is composed of, from front to back, a first block which is fixed (the positive lens for focussing), a second block which is movable (the negative lens for zooming), a third block which is movable (the positive lens for zooming) and a fourth block which is fixed (relay lens); the second and third blocks being movable along the optical axis in the opposite directions. The first block consists of a cemented doublet and a concavo-convex lens with the convex side facing the doublet, the second block consists of a negative meniscus and a cemented doublet, the third block consists of two front single lenses and a cemented doublet, the cemented surface thereof being convex toward the front or object side, while the fourth block is a relay lens consisting of two cemented doublets with a single lens therebetween. Each of the zooming blocks has a zooming ratio of about $\sqrt{10}\times$, respectively. The two blocks have a remarkably large aperture ratio, and therefore the correction of spherical aberration becomes an important task. The positive lens of the third block is therefore composed of two groups. For this purpose generally one used to adopt the so called condenser type wherein the curvature of the front surface of the front group is smaller than that of the rear surface. In such a system, the curvature of image is considerable, and the sign of the curvature changes between the two extreme values of focal length in a zoom lens system like this. When the curving of the image is nearly the same at focal length, there is still a possibility left for the correction of that aberration. But if not, as in this case, it is almost impossible to carry out the correction of that aberration throughout the entire zooming range.

In accordance with the present invention the third block is divided into three groups, and the two groups in the front portion are composed of single lenses, the curvature of the front surface being larger than the curvature of the rear surface in the two groups of the front portion, thereby maintaining the flatness of image throughout the whole zooming range.

The features and advantages of the present invention becomes more apparent by the following description in conjunction with illustrative embodiments of the invention shown in the drawing, in which:

FIG. 2 shows aberration curves of the first embodiment of the present invention.

Figure 1:
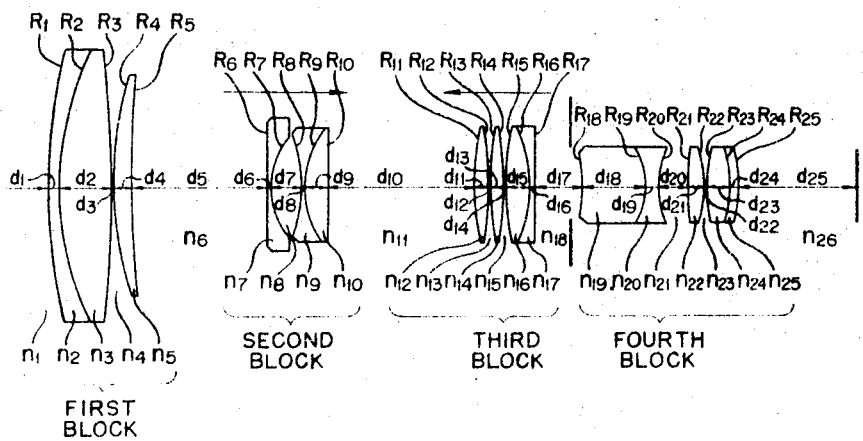
FIG. 1 shows a zoom lens optical system in accordance with the present invention.
Figure 3:
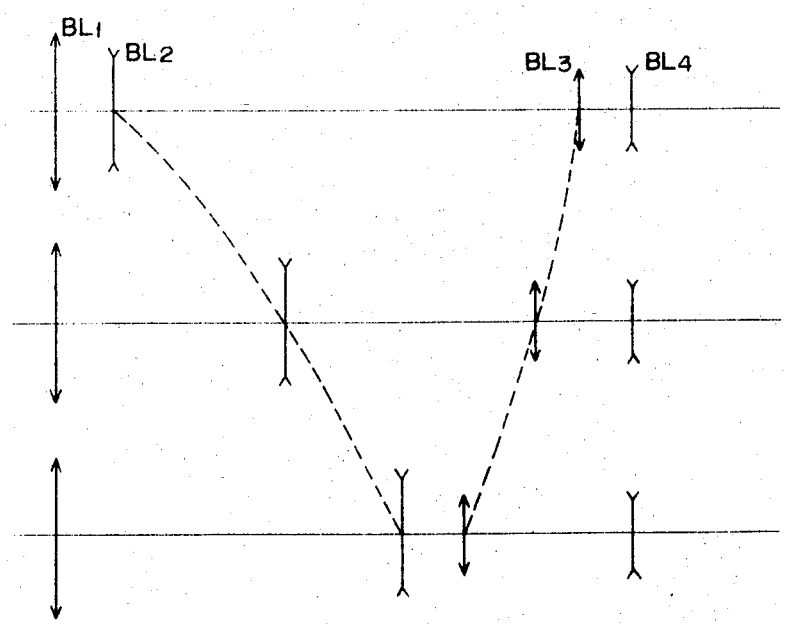
FIG. 3 shows the moving states of the blocks in the present invention.

A zoom lens optical system of the present invention is shown in FIG. 1 wherein $R_1$, $R_2$ ... $R_{25}$ indicate the radii of the various lens elements; $d_1$, $d_2$ ... $d_{25}$, the lens thicknesses and separations, and $n_1$, $n_2$ ... $n_{26}$ the refractive indices. As shown in FIG. 3, the movement of the third block is restricted to one direction. The zooming ratio is almost equally covered by both the second and fourth blocks, and therefore the change in spherical aberration is remarkably small in spite of the large zooming ratio of 10.

The following representative numerical values for the parameters $R_1$ to $R_{25}$, $d_1$ to $d_{24}$ and $n_1$ to $n_{26}$ of FIG. 1 are for a lens system embodying the invention for a 16 mm. movie camera; the focal length thereof being about $f=12$ to 120 mm., with a relative aperture of 1:2.2, the aberration thereof being as is shown in FIG. 2.

a relative aperture of 1:4. The aberration is as shown in FIG. 2.

|  |  | Refractive index | Abbé number |
|---|---|---|---|
| $R_1=+160.000$ | $d_1=2.1$ | $n_1=1.0$ | |
| $R_2=+69.600$ | $d_2=12.8$ | $n_2=1.78472$ | $vd=25.71$ |
| $R_3=-336.000$ | $d_3=0.1$ | $n_3=1.57135$ | $vd=52.95$ |
| $R_4=+75.000$ | $d_4=5.0$ | $n_4=1.0$ | |
| $R_5=+400.179$ | $d_5=$Variable | $n_5=1.51728$ | $vd=69.62$ |
| $R_6=+213.000$ | $d_6=1.4$ | $n_6=1.0$ | |
| $R_7=+19.720$ | $d_7=7.2$ | $n_7=1.72000$ | $vd=50.31$ |
| $R_8=-39.620$ | $d_8=0.8$ | $n_8=1.0$ | |
| $R_9=+22.800$ | $d_9=4.8$ | $n_9=1.52310$ | $vd=50.93$ |
| $R_{10}=+148.515$ | $d_{10}=$Variable | $n_{10}=1.78472$ | $vd=25.71$ |
| $R_{11}=+80.000$ | $d_{11}=3.0$ | $n_{11}=1.0$ | |
| $R_{12}=-133.000$ | $d_{12}=0.1$ | $n_{12}=1.62004$ | $vd=36.34$ |
| $R_{13}=+80.000$ | $d_{13}=3.0$ | $n_{13}=1.0$ | |
| $R_{14}=-133.000$ | $d_{14}=0.1$ | $n_{14}=1.62374$ | $vd=47.04$ |
| $R_{15}=+65.000$ | $d_{15}=7.5$ | $n_{15}=1.0$ | |
| $R_{16}=-28.700$ | $d_{16}=1.0$ | $n_{16}=1.7335$ | $vd=51.04$ |
| $R_{17}=+1,349.375$ | $d_{17}=$Variable | $n_{17}=1.78472$ | $vd=25.71$ |
| $R_{18}=-33.500$ | $d_{18}=16.0$ | $n_{18}=1.0$ | |
| $R_{19}=-15.200$ | $d_{19}=3.2$ | $n_{19}=1.76182$ | $vd=26.52$ |
| $R_{20}=+19.000$ | $d_{20}=7.5$ | $n_{20}=1.57309$ | $vd=42.67$ |
| $R_{21}=+106.800$ | $d_{21}=4.0$ | $n_{21}=1.0$ | |
| $R_{22}=-48.600$ | $d_{22}=0.3$ | $n_{22}=1.62041$ | $vd=60.29$ |
| $R_{23}=+42.000$ | $d_{23}=6.0$ | $n_{23}=1.0$ | |
| $R_{24}=-20.000$ | $d_{24}=2.0$ | $n_{24}=1.62041$ | $vd=60.29$ |
| $R_{25}=-52.809$ | | $n_{25}=1.64831$ | $vd=33.77$ |
| | | $n_{26}=1.0$ | |

|  |  | Refractive Indices | Abbé Number |
|---|---|---|---|
| $R_1=+384.000$ | $d_1=5.0$ | $n_1=1.0$ | |
| $R_2=+167.000$ | $d_2=26.0$ | $n_2=1.78472$ | $vd=25.71$ |
| $R_3=-975.000$ | $d_3=0.2$ | $n_3=1.57135$ | $vd=52.95$ |
| $R_4=+180.000$ | $d_4=12.0$ | $n_4=1.0$ | |
| $R_5=+1,200.243$ | $d_5=$Variable | $n_5=1.51728$ | |
| $R_6=+370.000$ | $d_6=2.0$ | $n_6=1.0$ | |
| $R_7=+47.100$ | $d_7=19.4$ | $n_7=1.72000$ | $vd=50.31$ |
| $R_8=97.000$ | $d_8=1.5$ | $n_8=1.0$ | |
| $R_9=+56.700$ | $d_9=11.5$ | $n_9=1.52310$ | $vd=50.93$ |
| $R_{10}=+308.713$ | $d_{10}=$Variable | $n_{10}=1.78472$ | $vd=25.71$ |
| $R_{11}=+192.000$ | $d_{11}=4.0$ | $n_{11}=1.0$ | |
| $R_{12}=-316.000$ | $d_{12}=0.1$ | $n_{12}=1.62004$ | $vd=36.34$ |
| $R_{13}=+192.000$ | $d_{13}=12.0$ | $n_{13}=1.0$ | |
| $R_{14}=-316.000$ | $d_{14}=0.1$ | $n_{14}=1.62374$ | $vd=47.04$ |
| $R_{15}=+154.000$ | $d_{15}=10.0$ | $n_{15}=1.0$ | |
| $R_{16}=-68.300$ | $d_{16}=2.4$ | $n_{16}=1.73350$ | $vd=51.04$ |
| $R_{17}=+4,904.833$ | $d_{17}=$Variable | $n_{17}=1.78472$ | $vd=25.71$ |
| $R_{18}=-80.500$ | $d_{18}=42.0$ | $n_{18}=1.0$ | |
| $R_{19}=-35.500$ | $d_{19}=7.9$ | $n_{19}=1.76182$ | $vd=26.52$ |
| $R_{20}=+52.400$ | $d_{20}=18.0$ | $n_{20}=1.57309$ | $vd=42.67$ |
| $R_{21}=+256.000$ | $d_{21}=9.6$ | $n_{21}=1.0$ | |
| $R_{22}=-117.000$ | $d_{22}=0.7$ | $n_{22}=1.62041$ | $vd=60.29$ |
| $R_{23}=+101.000$ | $d_{23}=14.4$ | $n_{23}=1.0$ | |
| $R_{24}=-35.000$ | $d_{24}=4.8$ | $n_{24}=1.62041$ | $vd=60.29$ |
| $R_{25}=+924.661$ | | $n_{25}=1.64831$ | $vd=33.77$ |
| | | $n_{26}=1.0$ | |

$d_5=1.4753$—$85.7353$—$133.2753$.
$d_{10}=184.5850$—$82.9507$—$5.2703$.
$d_{17}=11.3214$—$28.6957$—$58.8361$.
$f=36.0000$—$111.3410$—$352.3658$.

The following representative numerical values for the parameters, $R_1, R_2, \ldots R_{25}, d_1, d_2, \ldots d_{24}$ and $n_1, n_2, \ldots n_{26}$, are for a lens system for a 35 mm. camera in which the focal length is about $f=35$ to 350 mm. with

What is claimed is:

1. A zoom lens optical system comprising four lens blocks of which the first and fourth blocks are fixed and the second and third blocks are movable in opposite directions along the optical axis, the first block consisting of a cemented doublet and a concavo-convex lens with the convex surface facing the doublet, the second block consisting of a negative meniscus ad a cemented doublet, the third block consisting of two front single lenses and a cemented doublet, the cemented surface thereof being convex toward the object side, and the fourth block being a relay lens consisting of two cemented doublets with a single lens therebetween, the lenses having the following numerical values:

| | | | |
|---|---|---|---|
| $R_1=+160.000$ | $d_1=2.1$ | $n_1=1.0$ | |
| $R_2=+69.600$ | $d_2=12.8$ | $n_2=1.78472$ | $vd=25.71$ |
| $R_3=-336.000$ | $d_3=0.1$ | $n_3=1.57135$ | $vd=52.95$ |
| $R_4=+75.000$ | $d_4=5.0$ | $n_4=1.0$ | |
| $R_5=+400.179$ | $d_5=$Variable | $n_5=1.51728$ | $vd=69.62$ |
| $R_6=+213.000$ | $d_6=1.4$ | $n_6=1.0$ | |
| $R_7=+19.720$ | $d_7=7.2$ | $n_7=1.72000$ | $vd=50.31$ |
| $R_8=-39.620$ | $d_8=0.8$ | $n_8=1.0$ | |
| $R_9=+22.800$ | $d_9=4.8$ | $n_9=1.52310$ | $vd=50.93$ |
| $R_{10}=+148.515$ | $d_{10}=$Variable | $n_{10}=1.78472$ | $vd=25.71$ |
| $R_{11}=+80.000$ | $d_{11}=3.0$ | $n_{11}=1.0$ | |
| $R_{12}=-133.000$ | $d_{12}=0.1$ | $n_{12}=1.62004$ | $vd=36.34$ |
| $R_{13}=+80.000$ | $d_{13}=3.0$ | $n_{13}=1.0$ | |
| $R_{14}=-133.000$ | $d_{14}=0.1$ | $n_{14}=1.62374$ | $vd=47.04$ |
| $R_{15}=+65.000$ | $d_{15}=7.5$ | $n_{15}=1.0$ | |
| $R_{16}=-28.700$ | $d_{16}=1.0$ | $n_{16}=1.7335$ | $vd=51.04$ |
| $R_{17}=+1,349.375$ | $d_{17}=$Variable | $n_{17}=1.78472$ | $vd=25.71$ |
| $R_{18}=-33.500$ | $d_{18}=16.0$ | $n_{18}=1.0$ | |
| $R_{19}=-15.200$ | $d_{19}=3.2$ | $n_{19}=1.76182$ | $vd=26.52$ |
| $R_{20}=+19.000$ | $d_{20}=7.5$ | $n_{20}=1.57309$ | $vd=42.67$ |
| $R_{21}=+106.800$ | $d_{21}=4.0$ | $n_{21}=1.0$ | |
| $R_{22}=-48.600$ | $d_{22}=0.3$ | $n_{22}=1.62041$ | $vd=60.29$ |
| $R_{23}=+42.000$ | $d_{23}=6.0$ | $n_{23}=1.0$ | |
| $R_{24}=-20.000$ | $d_{24}=2.0$ | $n_{24}=1.62041$ | $vd=60.29$ |
| $R_{25}=-52.809$ | | $n_{25}=1.64831$ | $vd=33.77$ |
| | | $n_{26}=1.0$ | |

$d_5=0.3557$—$33.3557$—$55.1557$.
$d_{10}=77.1438$—$37.6049$—$2.5610$.
$d_{17}=4.7272$—$11.2661$—$24.5100$.
$f=12.0$—$33.9$—$117.1$.

wherein, R subscripts denote radii or curvative of the respective lens element; d subscripts denote thicknesses of the respective elements along the optical axis and axial air space separations between respective elements; n subscripts denote refractive indices of corresponding d subscripts; vd denotes Abbe numbers of respective elements; and f denotes the focal length.

2. A zoom lens optical system comprising four lens blocks of which the first and fourth blocks are fixed and the second and third blocks are movable in opposite directions along the optical axis, the first block consisting of a cemented doublet and a concavo-convex lens with the convex surface facing the doublet, the second block consisting of a negative meniscus and a cemented doublet, the third block consisting of two front single lenses and a cemented doublet, the cemented surface thereof being convex toward the object side, and the fourth block being a relay lens consisting of two cemented doublets with a single lens therebetween, the lenses having the following numerical values:

| | | Refractive Indices | Abbé Number |
|---|---|---|---|
| $R_1=+384.000$ | $d_1=5.0$ | $n_1=1.0$ | |
| $R_2=+167.000$ | $d_2=26.0$ | $n_2=1.78472$ | $vd=25.71$ |
| $R_3=-975.000$ | $d_3=0.2$ | $n_3=1.57135$ | $vd=52.95$ |
| $R_4=+180.000$ | $d_4=12.0$ | $n_4=1.0$ | |
| $R_5=+1,200.243$ | $d_5=$Variable | $n_5=1.51728$ | |
| $R_6=+370.000$ | $d_6=2.0$ | $n_6=1.0$ | |
| $R_7=+47.100$ | $d_7=19.4$ | $n_7=1.72000$ | $vd=50.31$ |
| $R_8=-97.000$ | $d_8=1.5$ | $n_8=1.0$ | |
| $R_9=+56.700$ | $d_9=11.5$ | $n_9=1.52310$ | $vd=50.93$ |
| $R_{10}=+308.713$ | $d_{10}=$Variable | $n_{10}=1.78472$ | $vd=25.71$ |
| $R_{11}=+192.000$ | $d_{11}=4.0$ | $n_{11}=1.0$ | |
| $R_{12}=-316.000$ | $d_{12}=0.1$ | $n_{12}=1.62004$ | $vd=36.34$ |
| $R_{13}=+192.000$ | $d_{13}=12.0$ | $n_{13}=1.0$ | |
| $R_{14}=-316.000$ | $d_{14}=0.1$ | $n_{14}=1.62374$ | $vd=47.04$ |
| $R_{15}=+154.000$ | $d_{15}=10.0$ | $n_{15}=1.0$ | |
| $R_{16}=-68.300$ | $d_{16}=2.4$ | $n_{16}=1.73350$ | $vd=51.04$ |
| $R_{17}=+4,904.833$ | $d_{17}=$Variable | $b_{17}=1.78472$ | $vd=25.71$ |
| $R_{18}=-80.500$ | $d_{18}=42.0$ | $n_{18}=1.0$ | |
| $R_{19}=-35.500$ | $d_{19}=7.9$ | $n_{19}=1.76182$ | $vd=26.52$ |
| $R_{20}=+52.400$ | $d_{20}=18.0$ | $n_{20}=1.57309$ | $vd=42.67$ |
| $R_{21}=+256.000$ | $d_{21}=9.6$ | $n_{21}=1.0$ | |
| $R_{22}=-117.000$ | $d_{22}=0.7$ | $n_{22}=1.62041$ | $vd=60.29$ |
| $R_{23}=+101.000$ | $d_{23}=14.4$ | $n_{23}=1.0$ | |
| $R_{24}=-35.000$ | $d_{24}=4.8$ | $n_{24}=1.62041$ | $vd=60.29$ |
| $R_{25}=+924.661$ | | $n_{25}=1.64831$ | $vd=33.77$ |
| | | $n_{26}=1.0$ | |

$d_5=1.4753$—$85.7375$—$133.2753$.
$d_{10}=184.5850$—$82.9507$—$5.2703$.
$d_{17}=11.3214$—$28.6957$—$58.8361$.
$f=36.0000$—$111.3410$—$352.3658$.

wherein, R subscripts denote radii of curvature of the respective lens elements; d subscripts denote thicknesses of the respective elements along the optical axis and air spaces between respective elements; n subscripts denote refractive indices of corresponding d subscripts; vd denote Abbe numbers of respective elements; and f denotes the focal length.

References Cited
FOREIGN PATENTS 417,141 1/1967 Switzerland.

DAVID SCHONBERG, Primary Examiner

A. M. OSTRAGER, Assistant Examiner

U.S. Cl. X.R.

350—214